United States Patent [19]

Hellouin de Menibus

[11] 4,368,391

[45] Jan. 11, 1983

[54] HYDRAULIC PROCESS AND APPARATUS FOR THE RECOVERY OF ELECTRICAL ENERGY FOR USE IN MOTOR TEST STATIONS

[75] Inventor: Olivier Hellouin de Menibus, Estampes, France

[73] Assignee: A M S S.A., Fresnes, France

[21] Appl. No.: 218,494

[22] Filed: Dec. 19, 1980

[30] Foreign Application Priority Data

Dec. 28, 1979 [FR] France ............................... 79 32037

[51] Int. Cl.³ .............................................. H02P 9/00
[52] U.S. Cl. .................................... 290/4 D; 290/1 R
[58] Field of Search ................ 60/414; 417/331–333, 417/411; 290/1 R, 4 D, 4 S

[56] References Cited

U.S. PATENT DOCUMENTS 2,104,387 1/1938 Hull et al. ........................... 417/411

FOREIGN PATENT DOCUMENTS 485994 3/1977 Australia ............................... 60/414

*Primary Examiner*—Ulysses Weldon
*Assistant Examiner*—Shelley Wade
*Attorney, Agent, or Firm*—Sandler & Greenblum

[57] ABSTRACT

A hydraulic process and apparatus recover energy generated by the testing of a motor in the form of electrical energy. The process includes utilizing a hydraulic pump and an asynchronous electric generator and coupling the shaft of the motor being tested to the hydraulic pump, feeding a plurality of hydraulic motors by the pump in accordance with the feed from the hydraulic pump and coupling the hydraulic motors to the asynchronous generator so that the motors will be capable of operating both as pumps and motors. The device for recovering energy includes a hydraulic volumetric pump, an asynchronous electric generator, and a pressurized oil reservoir connected to the hydraulic pump. The motor being tested is attached to the pump. A plurality of hydraulic motors are connected in parallel with the hydraulic pump and in series with the asynchronous electric generator so that the motors can act both as pumps by feeding themselves and as motors to furnish energy to the asynchronous generator.

29 Claims, 4 Drawing Figures

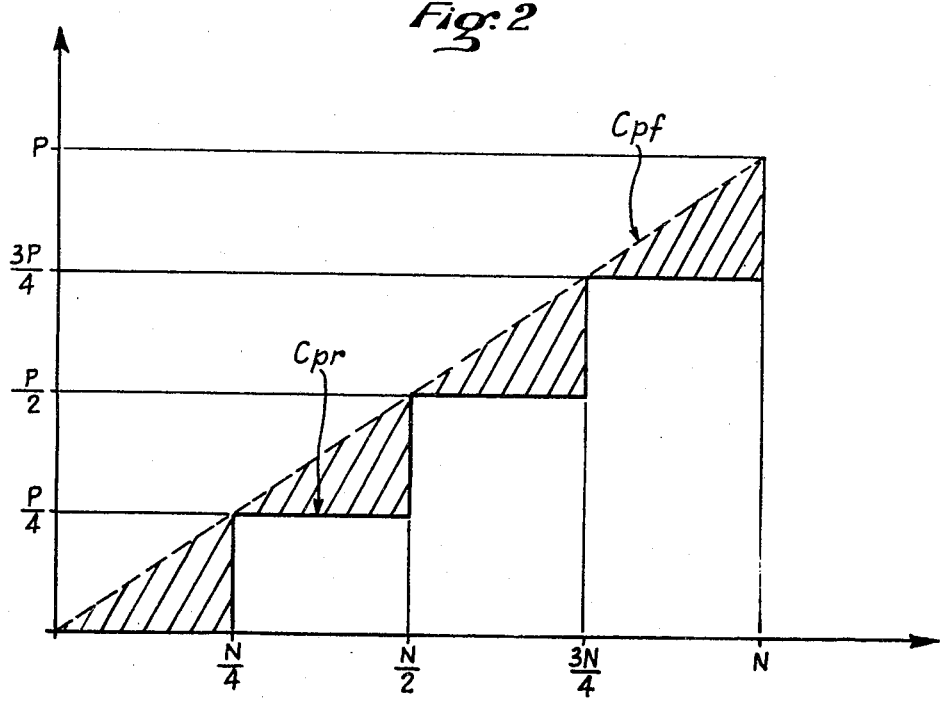
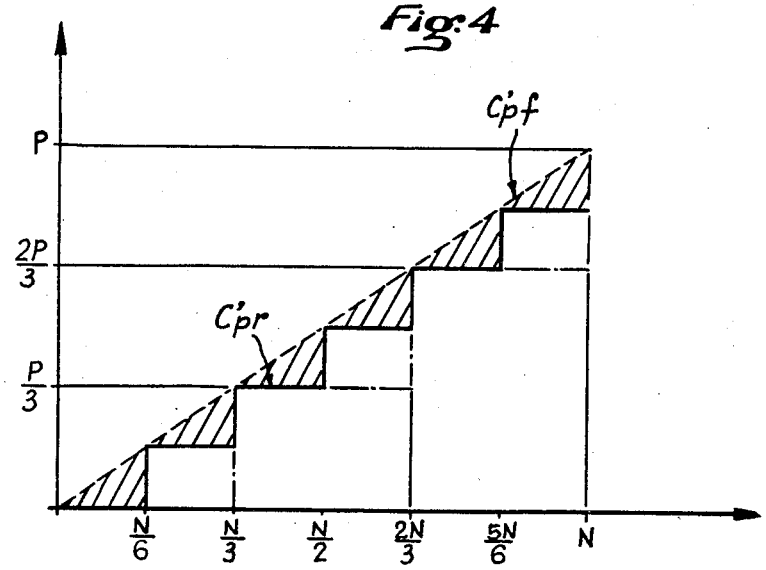

HYDRAULIC PROCESS AND APPARATUS FOR THE RECOVERY OF ELECTRICAL ENERGY FOR USE IN MOTOR TEST STATIONS

BACKGROUND OF THE INVENTION

1. Field of the Invention

The present invention relates generally to a hydraulic process and apparatus for recovering electrical energy to use in motor test stations and more particularly to such a process and apparatus utilizing an asynchronous electric motor and a pump.

2. Discussion of Prior Art

Thermal motors, particularly high power motors, require operational and/or endurance testing, both of which are generally performed after the motors leave the assembly line.

These tests, to be representative of the conditions of use, must be carried out at variable speeds and moments, the braking moment being generally obtained by means of a frictional brake or an electromagnetic brake.

The energy furnished by the motors thus tested corresponds to the efficiency of the motors and to the energy spent, and is, in general, removed by cold water circulation and thereby lost.

It is thus clear that a considerable amount of energy is wasted in this fashion, and there is therefore a need for a method and apparatus for recovering at least a portion of this energy.

However, it is particularly difficult, for obvious reasons, to re-use the recovered energy on location, e.g., in the form of heat, and, it is known that a particularly beneficial means for recovering this energy consists of transforming the energy into electrical energy in a manner so as to be able to reinject it directly into the electrical network. A suitable process and apparatus for carrying out the process to obtain the above result must satisfy the following criteria;

(a) simplicity of installation and maintenance;
(b) reliability;
(c) a wide range of operational speeds (in a ratio of about 10:1);
(d) include a couple or torque which is adjustable at will and independent of the speed;
(e) low cost;
(f) high efficiency; and
(g) a good quality of electric current generated, i.e., having a frequency sufficiently fixed and precise and free of harmonics so as to be able to be reinjected without inconvenience into the electrical network.

There presently exist a number of techniques whose aim is to transform the mechanical power of a motor having a variable speed into electric power of fixed frequency.

To obtain this result, one purely electrical process comprises a frequency converter associated with an alternator. This process is, however, unacceptable, because the electrical current thus generated includes substantial harmonics which disturb the network in an unacceptable fashion.

Another electrical process consists of utilizing an asynchronous generator with injection of alternating current having a variable frequency.

Other processes consist of transmitting the mechanical power of the motor shaft, which turns at a variable speed, to a receiver shaft, which turns at a fixed speed or at a quasi-fixed speed, and to then couple the receiver shaft to an alternator or to an asynchronous generator connected to the electric network. To obtain a fixed speed of the receiver shaft, the following techniques are known: varying the mechanical speed, Ward Leonard type systems, and hydraulic systems having hydrostatic transmissions.

However, none of the above known processes can simultaneously satisfy the various criteria stated above.

SUMMARY OF THE INVENTION

It is for this reason that the present invention proposes a novel hydraulic process and apparatus which better correspond to the above objectives.

The process according to the present invention is remarkable in that it comprises:

(a) coupling the shaft of a motor being tested, which turns at a variable speed, to a hydraulic pump;

(b) feeding, in parallel, via the pump, a plurality of hydraulic motors in succession in a manner such that they are operated successively, according to the increase of the feed from the pump, and, furthermore, which are then successively prevented or isolated from operating during the decrease of the feed while the motors turn at a single quasi-constant speed; and (c) coupling the assembly of hydraulic motors in series to an asynchronous electric motor which is connected to the power supply such that the motors first function as pumps by feeding on themselves and by consuming a low electric power to successively become motors and then furnish energy to the asynchronous motor, which thus becomes a generator.

For carrying out this process, the apparatus according to the invention is unique in that it comprises a reservoir of pressurized oil, a volumetric hydraulic pump coupled to the motor being tested, which motors turns at a variable speed, and (n) hydraulic motors connected in parallel across the pump circuit and coupled in series with an asynchronous electric motor connected to the electric power supply. A successive feed system corresponding to each motor is provided for successively placing the motors into motor operation, in accordance with the increase of the pump feed, and, conversely, to successively withdraw or isolate them from operation as a function of the decrease of the feed. The motors turn at an identical and quasi-constant speed such that the (n) motors operate first as pumps, while re-energizing themselves and while consuming a low electric power, then successively become motors and thereby furnish the necessary energy to an asynchronous motor, which then becomes a generator.

Preferably, this device further comprises an oil-water or oil-air heat exchanger adapted to evacuate the low power dissipated in the form of heat, together with a filter positioned along the return line to the reservoir.

A first embodiment of the present invention is notable in that: (1) the volumetric pump and the (n) hydraulic motors each comprise a fixed displacement; (2) the (n) motors are identical and are each provided with a non-return valve mounted in parallel across each respective motor; and (3) the feed system of the motors is such that when the pump feed attains a flow rate (b) common to the motors, the first of the motors is fed, a double feed causing the feeding of two motors, and so on until a flow rate of (n)×(b) makes it possible to feed all of the (n) motors, the later diminution of the feed conversely causing the successive isolation of the motors from operation.

According to a preferred embodiment, the system is notable in that the feed system of the motors comprises (n+1) pressure relief valves and means for setting, controlling or piloting the said valves at the same pressure, the valves being positioned in the hydraulic circuit between the motors as well as downstream and upstream thereof, such that the relief valve upstream of the motors controls the return pressure of the pump until the feed from this pump reaches or attains the feed of the first motor, at which time the relief valve opens completely, the second relief valve then acting as a regulator; this is repeated until the complete opening of the next to last relief valve, which corresponds to the feeding of the last motor being regulated with respect to its pressure by the last valve.

Preferably, in this case, the displacements of the pump and of the (n) hydraulic motors are selected such that at the maximum speed of the motor being tested, the feed of the hydraulic pump is substantially equal to (n+1) times that of a single hydraulic motor, each displacement equally being a function of the speed of rotation desired, i.e., a function of the frequency of the electric network or supply and of the number of pairs of poles of the electric motor.

A second embodiment of the invention is notable in that the volumetric pump and the (n) motors each has a fixed displacement, the displacement of one of the motors, hereinafter referred to as the small motor, being equal to half of the common displacement of the other motors, hereinafter referred to as the large motors, and a non-return valve being mounted in parallel across each motor. The feed system is established such that when the feed of the pump reaches the feed d/2 of the small motor, the small motor is fed, a double feed (d) of the pump making it possible to feed one of the large motors and to stop the feed of the small motor. This system continues to operate in a manner such that a feed of the pump equal to an even multiple of d/2 causes the feeding of the small motor to stop and the feeding of a number of large motors equal to half of this multiple, while a feed equal to an odd multiple of d/2 makes it possible to feed the small motor and a number of large motors equal to this multiple means 1 and divided by 2.

Preferably, in this embodiment, the displacements of the pump and of the (n) hydraulic motors are selected in a manner such that at the maximum speed of the motor tested, the feed of the hydraulic pump is substantially equal to (n)×(the feed of the large motor) or (2n)×(the feed of the small motor), each displacement being equally a function of the speed of rotation desired, i.e., of the frequency of the electric supply and of the number of pairs of poles of the electric motor.

According to a preferred form of this second embodiment, the system is notable in that the feed system of the motors comprises two pressure relief valves provided with a setting means. These relief valves are positioned in the hydraulic circuit, respectively upstream and downstream of the feed shunt of the small motor and a solenoid-operated valve provided in each feed shunt of a large motor, while two pressure detectors and controllers, respectively, for the opening and closing, as a function of the feed, of the solenoid-operated valves are provided such that the first relief valve upstream regulates the pressure of the pump until the feed of the pump reaches the feed d/2 of the small motor, at which level the relief valve completely opens while feeding the small motor with pressure regulated by the downstream valve, a double feed (d) causing the detection of a loss of load corresponding to a feed d/2 by the opening detector, which thus controls the opening of a first solenoid-operated valve causing the feeding of a large motor, while the pressure is regulated by the first relief valves. This operation continues so that the feed of the pump equals an even multiple of d/2, causing the opening of a number of solenoid-operated valves equal to half of this multiple, with pressure regulation by the upstream pressure relief valve, while a feed equal to an odd multiple of d/2 causes the opening of the upstream relief valve, and thus the feeding of the small motor, as well as the opening of a number of solenoid-operated valves equal to this multiple minus 1 and divided by 2, with regulation of the pressure by the downstream relief valve.

Preferably, in this second embodiment, the two pressure detectors and solenoid-operated valve controllers are positioned, respectively, downstream of the relief valves and in the setting circuit of these valves, to respectively control the opening and the closing of the solenoid-operated valves as a function of the feed and to thus permit feeding or, conversely, the isolation of the large motors from operation.

Each detector thus comprises a control pressure switch and a restriction adapted to activate the pressure switch while causing a sufficient load loss as a function of feed.

According to a third embodiment, the hydraulic pump and/or at least a portion of the hydraulic motors has a variable displacement.

The above objects, features, and advantages of the present invention are achieved in one aspect thereof by a hydraulic process for recovering electrical energy from the energy furnished by a motor being tested. The process utilizes a hydraulic pump and an asynchronous electric generator and includes coupling a variable turning speed shaft of the motor being tested to the hydraulic pump. A plurality of hydraulic motors are fed by the hydraulic pump and are adapted to operate successively as the feed from the pump increases and to be successively withdrawn or isolated from operation as the feed decreases, the hydraulic motors turning at a generally constant speed. The hydraulic motors are coupled in series to the asynchronous electric generator, the generator in turn being connected to an electric power supply. The motors are adapted to first operate as pumps and to then consume electrical energy in order to successively become motors and to thereby furnish energy to the asynchronous generator.

The above features, advantages, and objects of the present invention are attained in a second aspect thereof by a hydraulic device for recovering energy generated by a motor being tested in the form of electricity. The device includes a hydraulic volumetric pump, an asynchronous electric generator, and a pressurized oil reservoir which is connected to said hydraulic pump, which is in turn coupled to said motor being tested. The motor is adapted to turn at a variable speed. A plurality of hydraulic motors are connected in parallel with said hydraulic pump and in series with said asynchronous generator. The hydraulic motors are adapted to first operate as pumps and then to successively become motors and furnish energy to said asynchronous generator.

BRIEF DESCRIPTION OF THE DRAWINGS

The invention will now be described with reference to the annexed drawings in which:

FIG. 2 is a graph of a theoretical curve of the power recovered by means of the embodiment shown in FIG. 1 for a constant motor torque;

FIG. 4 illustrates a theoretical curve of the power recovered by means of the device of the embodiment shown in FIG. 3, for a motor having a constant torque.

DESCRIPTION OF PREFERRED EMBODIMENTS

Figure 1:
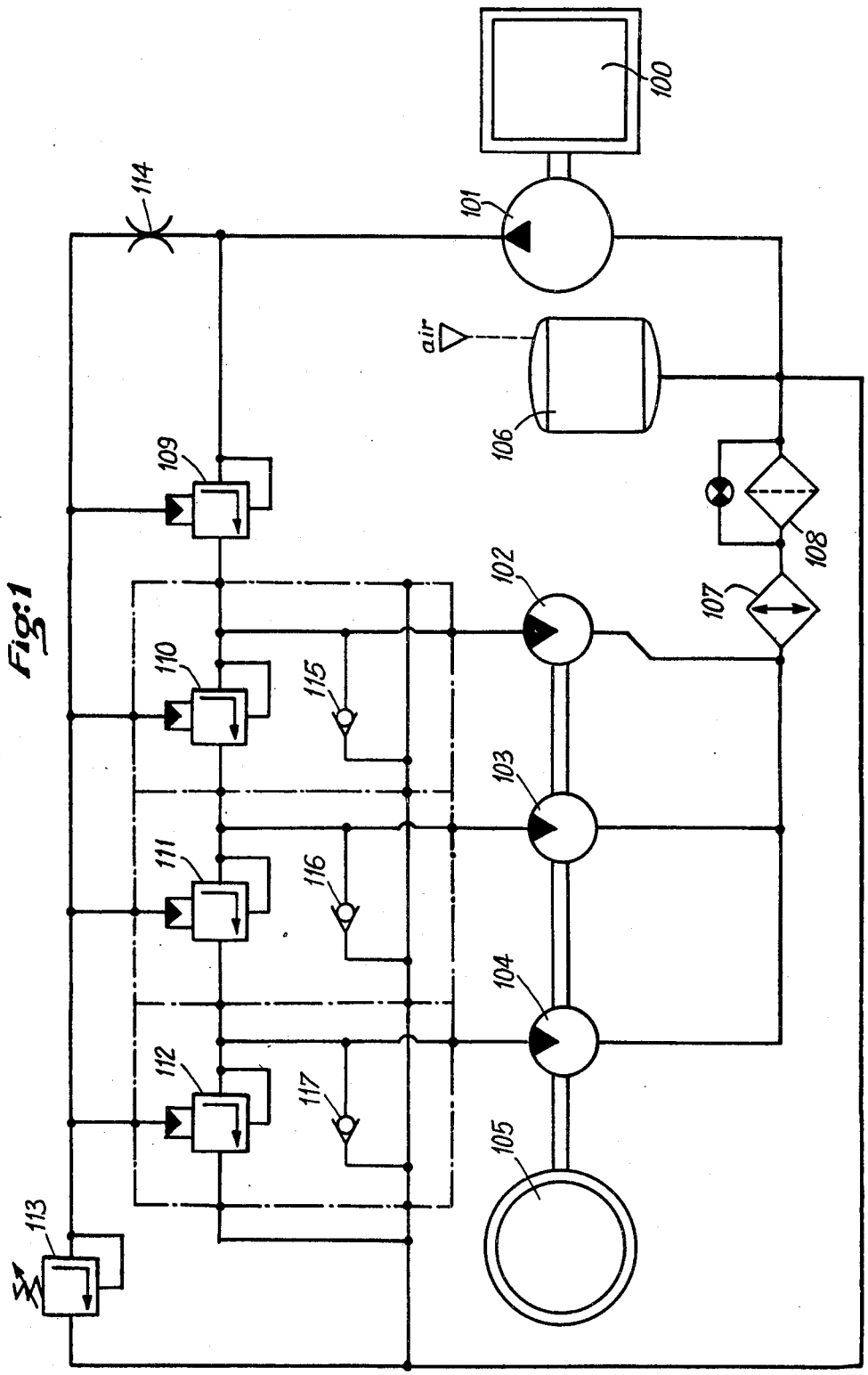
FIG. 1 is a schematic illustration of a first embodiment of the invention comprising three hydraulic motors.

FIG. 1 illustrates a first embodiment which essentially comprises a motor and a receptor used in equipment and machinery.

The motor comprises a thermal motor 100 to be tested; the motor is coupled to a volumetric hydraulic pump 101 having a fixed displacement. The assembly rotates at a variable speed depending upon the testing conditions of the motor 100.

The receptor comprises a plurality of hydraulic volumetric motors (e.g., shown as three motors 102, 103, and 104 which have fixed displacements and which are all identical).

The three motors are coupled among themselves, and the assembly including the motors is coupled to an asynchronous generator motor 105 connected to the electric power supply.

The motors 102–104 are connected, in parallel, in the hydraulic circuit of pump 101. The hydraulic circuit further comprises an oil reservoir 106, which is air pressurized, an oil-water or oil-air heat exchanger 107 adapted to evacuate the low power which is dissipated in the form of heat, and a filter 108 positioned in the return line to the reservoir.

Upstream of the feed circuit of the motors, between the motors, and downstream of the circuit, pilot-operated relief valves 109, 110, 111 and 112 are provided, i.e., (n+1) valves are provided if (n) represents the number of motors. Each pilot-operated or other relief valve has external settings and drains.

Valves 109–112 are piloted by a pilot valve 113 which is positioned in the circuit by means of a piloting restriction 114 in a manner so as to feed and control the relief valves. These valves are adjusted at the same pressure and are particularly selected so as to open when their downstream pressure is equal to their upstream pressure.

Each motor 102, 103, and 104 is further provided with a non-return valve, i.e., respectively, valves 115, 116 and 117, which are mounted in parallel across the motors.

The operation of the first embodiment is as follows:

As soon as electric motor 105 has been started, each of the hydraulic motors 102, 103 and 104 operates a pump so as to feed itself by means of its non-return valve 115, 116 and 117, respectively.

It is clear that the receptor assembly thus consumes a very low electric power.

When the motor 100 is operated at a low speed, the back pressure of the pump 101, and therefore the torque, is regulated by first valve 109. When the speed of the motor 100 is such that the feed of the pump 101 exceeds the feed of the first hydraulic motor 102, the valve 109 opens completely, the non-return valve 115 closes and the motor 102 thus furnishes the energy to the electric motor 105, which becomes a generator, the two other motors 103 and 104 still operating as pumps.

When valve 109 is completely opened, it is valve 110 which controls pressure; the pressure remains substantially unchanged.

The progressive increase of the speed of motor 100 causes an increase in the feed from pump 101 and the successive opening of valves 109, 110 and 111 in a manner such that motors 102, 103 and 104 will, in succession, furnish energy to the electric supply by means of electric motor 105, which operates as a generator. Conversely, a decrease in the speed of motor 100 will automatically cause the successive isolation or cut-off of the motors of the high pressure circuit, while maintaining a constant torque.

The receptor assembly obviously must rotate at a quasi-constant speed, which speed depends upon the frequency of the electric power supply and on the number of pairs of poles of motor 105. The displacements of the pump 101 and of the motors 102, 103, and 104 are selected in a manner so as to achieve this condition. Preferably, the displacements are selected in a manner such that at the maximum speed of thermal motor 100, the feed of hydraulic pump 101 is equal to approximately (n+1) (in this case, 4)×the feed of a single hydraulic motor.

With this device, all of the energy provided is not entirely transmitted to the electric power supply. The actual efficiency of the system depends on one hand upon losses which can be attributed to each element used and on the other hand to intrinsic losses of the system.

FIG. 2 shows the Cpf power curve actually furnished by the function of the speed of motor 100, at a constant torque and for a system having three hydraulic motors of the type described with respect to FIG. 1.

In this figure, N represents the maximum speed of motor 100. The displacement of the motors being selected as noted above, the first motor 102 will furnish the energy for a velocity of the motor equivalent to N/n+1, or in this case N/4 (the hatched zone representing lost power).

This figure well shows the theoretical stepwise recovery, from which one is able to calculate the system's efficiency, which is in this case ¾ and more generally n/n+1, integrated between velocity 0 and the maximum motor velocity N.

The theoretical efficiency formula shows that the efficiency grows with the number of motors utilized. However, it would not appear to be worthwhile to increase the number of motors beyond 4 or 5, because the theoretical power gain received becomes negligible because of the hydraulic losses of the supplementary motors and because of the supplemental cost of the installation itself.

Furthermore, it is possible that for the tests and/or uses contemplated, certain speeds will be more frequently used. Accordingly, the displacements of the hydraulic motors will be selected in a fashion so as to operate as often as possible close to their most efficient manner.

The system as described above particularly satisfies all of the objectives previously recited. More particularly, it is simple in its design and the elements utilized, and is easily placed into operation.

The only necessary adjustment is the torque, which remains stable irrespective of motor speed and which is adjustable by means of pilot valve 113. This device, particularly, makes it possible to perform tests over a range of speeds greater than 10.

However, it is possible to further improve the efficiency of recovery with a device comprising the same number of hydraulic motors. To achieve this aim, a second embodiment of the present invention, schematically illustrated in FIG. 3, is utilized.

Figure 3:
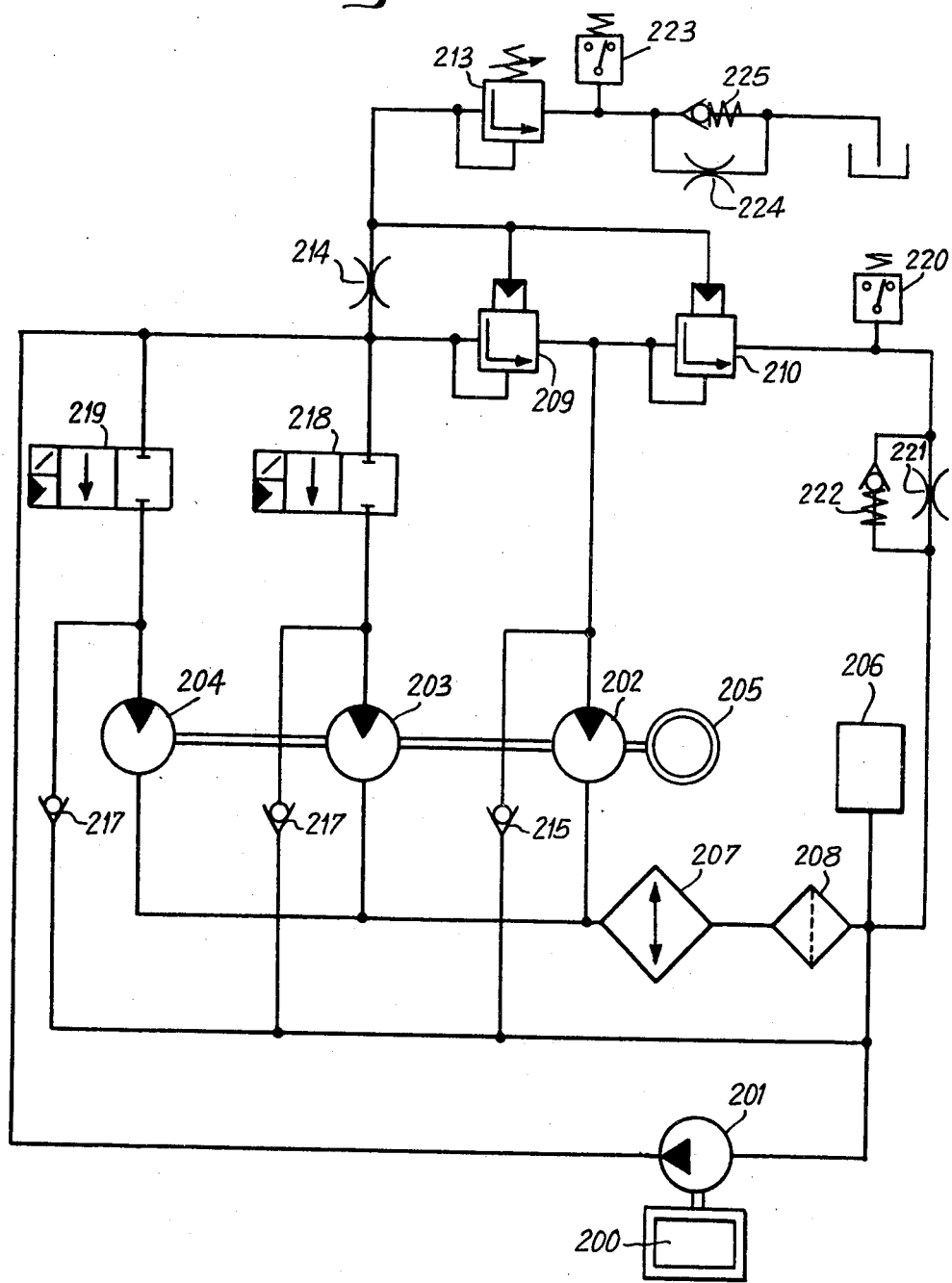
FIG. 3 is a schematic illustration of a second embodiment according to the present invention.

FIG. 3 illustrates a system which comprises, as does the system of FIG. 1, a motor 200 to be tested, a volumetric hydraulic pump 201 having a fixed displacement, three hydraulic motors 202, 203 and 204 also having fixed displacements, an asynchronous electric generator 205, an oil reservoir 206 which is air-pressurized, a heat exchanger 207, a filter 208, and three non-return valves 215, 216 and 217 mounted in parallel, respectively, across motors 202, 203 and 204.

This embodiment, however, comprises only two pilot-operated relief valves 209 and 210 which are positioned, respectively, upstream and downstream of the shunt of motor 202.

Furthermore, motor 202 has a displacement which is equal to half that of the displacement common to the two other motors 203 and 204.

The feed shunts of motors 203 and 204 are respectively provided with solenoid-operated valves 218 and 219, which are controlled as explained below.

Valves 209 and 210 are piloted or set by a pilot valve 213, connected to the circuit by restriction 214, while, on one hand, a pressure switch 220 and a restriction 221 provided with a load valve 222 are positioned in the circuit after the valve 210, and on the other hand, a pressure switch 223 and a restriction 224 provided with a load valve 225 are positioned after piloting valve 213.

In this assembly, whose motor is similar to that of FIG. 1, the small hydraulic motor 202 is fed in the same fashion as the motor 102 in FIG. 1.

Given that the displacement of motor 202 is equal to half that of the two other motors, its feed will also be equal to half that of these other motors, such feed hereinafter referred to as d/2.

For a feed d/2 of pump 201, valve 209 opens and motor 202 is fed, the pressure thus being regulated by valve 210.

When the feed reaches the double value d, a feed d/2 circulates within the restriction 221 and valve 222 remains closed. The restriction 221 creates, for a feed d/2, a loss of load sufficient to activate the pressure switch 220, which in turn controls the opening of solenoid-operated valve 219 (or 218) to cause the motor 204 (or 203) to feed, while the pressure is adjusted by valve 209.

The role of valve 222 is to limit the pressure downstream of valve 210 while the feed in the circuit becomes substantial. A feed of 3d/2 will again open valve 209, a feed of 2d will open the solenoid-operated valve 218, (or 219) and a feed of (5d/2) will again open 209 such that the feeds of: d/2, d, 3d/2, 2d and 5d/2 will cause, respectively, motor 202 to function alone, motor 204 (or 203) to function alone, motors 202 and 204 (or 203) to function, motors 204 and 203 to function, and finally three motors 202, 203 and 204 to function.

In an opposite sense, when the flow becomes less than 5d/2, motor 202 is automatically isolated and the pressure is adjusted by valve 209. If the feed becomes less than 2d, the pressure has a tendency to drop, below the value adjusted by the valve 213, so that the flow which circulates in restriction 224 cancels out, which causes a drop in pressure downstream of pilot valve 213 and an activation of pressure switch 223, which accordingly controls the closing of solenoid-operated valves 218 and therefore the isolation or shut-off of motor 203. The small motor 202 again becomes an energy supplier and continues to operate during the decrease of the feed.

FIG. 4 illustrates the theoretical power recovery curve $C'pr$, and the actual power furnished curve $C'pf$ from the motor tested, as a function of the speed of the motor and at a constant torque, in the case of a device having three motors of the type described with respect to FIG. 3 (N being equal to the maximum speed of the motor tested).

Furthermore, the displacements are selected, as has been noted above, in a manner such that at the maximum speed N of the motor, the feed of the hydraulic pump will be substantially equal to n times the feed d of a large motor 203 and 204 (or 2n times the feed d/2 of motor 202). It is for this reason that the small motor will furnish energy beginning at a speed of N/6 and motor 204 beginning at a speed of N/3.

It is clear that the efficiency obtained is, in this case, equal to 5/6, the efficiency for n motors being equal to $(2n-1)/2n$. This efficiency is obviously better than that of the first embodiment described. To obtain the same average theoretical efficiency in this first embodiment, as set in the second embodiment utilizing (n) motors, it would be necessary to utilize $(2n-1)$ motors.

It is thus possible to improve the efficiency of the devices by increasing the number of motors, and also by an assembly provided with several small motors whose displacements are equal to fractions of those of the large motors, in a manner which tends to a theoretical efficiency of 1, i.e., in which the maximum of the power recovery curve approaches the power furnished curve.

Furthermore, according to another embodiment of the invention, the volumetric pump and/or at least a portion of the motors can have a variable displacement.

Although the invention has been described with respect to particular means and apparatus, it is to be understood that the invention is not limited to the particulars disclosed and can be modified by using other equipment, means, and apparatus, as well as by modifying the interconnection of the various elements of the assembly without going beyond the scope of the invention.

What is claimed is:

1. A hydraulic process for recovering electrical energy from the energy furnished by a motor being tested, said process comprising:
    (a) coupling a shaft on a motor being tested, which is adapted to turn at variable speeds, to a hydraulic pump;
    (b) feeding a plurality of hydraulic motors by said hydraulic pump; and
    (c) coupling said hydraulic motors to an asynchronous electric generator in series and connecting said generator to an electric power supply, said hydraulic motors adapted to operate as pumps by hydraulically feeding themselves and consuming a low electric power and adapted to serve as motors by then furnishing energy to the asynchronous generator.

2. A hydraulic process in accordance with claim 1 further comprising feeding said hydraulic motors successively, according to the increase of feed from said hydraulic pump.

3. A hydraulic process in accordance with claim 2 further comprising successively isolating said hydraulic motors from operation in accordance with the decrease of feed from said pump.

4. A hydraulic process in accordance with claim 3 further comprising turning said hydraulic motors at a generally constant speed.

5. A hydraulic device for recovering energy from the energy furnished by a motor being tested, said energy being recovered in the form of electrical energy, said device comprising:
(a) a hydraulic volumetric pump;
(b) an asynchronous electric generator;
(c) a pressurized oil reservoir connected to said volumetric hydraulic pump, said pump being coupled to a motor being tested, said motor adapted to turn at variable speeds; and
(d) a plurality of hydraulic motors connected in parallel with said volumetric hydraulic pump and coupled in series with said asynchronous electric generator, said generator in turn being connected to an electric power supply, said motors adapted to operate as pumps by hydraulically feeding themselves by consuming electricity and adapted to serve as motors by then furnishing energy to said asynchronous generator.

6. A hydraulic device in accordance with claim 5 further comprising means for successively placing said hydraulic motors into operation as said hydraulic pump increases its feed and means for successively withdrawing said hydraulic motors from operating as said hydraulic pump decreases its feed.

7. A hydraulic device in accordance with claim 6 wherein said hydraulic motors are adapted to turn at identical and generally constant speeds.

8. A hydraulic device in accordance with claim 7 futher comprising an oil-to-water or oil-to-air heat exchanger adapted to evacuate power dissipated by the device in the form of heat and a filter adjacent to said reservoir.

9. A hydraulic device in accordance with claim 7 wherein said volumetric pump and said hydraulic motors comprise fixed displacements, said plurality of hydraulic motors being identical and provided with non-return valves mounted in parallel on said motors.

10. A hydraulic device in accordance with claim 9 wherein said feed from said volumetric hydraulic pump is adapted to feed said hydraulic motors, the number of hydraulic motors being fed at any one time depending upon the feed from said hydraulic pump, and wherein the feed from said volumetric pump is equivalent to the number of hydraulic motors fed at any one time multiplied by the feed of each of said hydraulic motors, and wherein the maximum feed from said volumetric hydraulic pump is equivalent to the feed of each hydraulic motor multiplied by the number of hydraulic motors.

11. A hydraulic device in accordance with claim 10 wherein the means for placing said hydraulic motors into operation comprise a plurality of valves, said plurality of valves comprising one more than said plurality of hydraulic motors, said valves adapted to limit pressure, said valves adapted to be set to the same pressure and being positioned in a hydraulic circuit between said hydraulic motors as well as upstream and downstream of said hydraulic motors.

12. A hydraulic device in accordance with claim 11 wherein one of said valves is positioned upstream of said hydraulic motors and regulates the back pressure of said hydraulic pump until the feed from said hydraulic pump attains the feed of a first one of said hydraulic motors in order to open said one valve completely, a second one of said valves adapted to then serve as a regulating valve.

13. A hydraulic device in accordance with claim 12 wherein each of said valves is adapted to operate as a regulator, dependent upon the level of feed from said volumetric hydraulic pump, until said last hydraulic motor is pressure regulated by a valve positioned downstream of said motors.

14. A hydraulic device in accordance with claim 10 wherein said volumetric hydraulic pump and said hydraulic motors have displacements selected so that when said motor being tested achieves its maximum speed, the feed of said hydraulic pump will be substantially equal to the number of valves multiplied by the feed of one of said hydraulic motors, said displacements being also selected as a function of the speed of rotation desired, which is a function of the frequency of the electric supply and of the number of poles of said asynchronous generator.

15. A hydraulic device in accordance with claim 7 wherein said volumetric pump and said plurality of hydraulic motors have fixed displacements.

16. A hydraulic device in accordance with claim 15 wherein one of said hydraulic motors is a small motor having a displacement equal to half of the displacement of said other hydraulic motors.

17. A hydraulic device in accordance with claim 16 wherein non-return valves are mounted in parallel across each of said hydraulic motors and means are provided for feeding said motors in a predetermined fashion.

18. A hydraulic device in accordance with claim 17 wherein said means for feeding said motors comprise means for feeding said small motor when the feed from said hydraulic pump equals the feed of said small motor and means for feeding one of said other motors when the feed from said hydraulic pump is equal to twice the feed of said small motor.

19. A hydraulic device in accordance with claim 17 wherein said means for feeding said hydraulic motors comprises means for feeding said small motor when the feed of said hydraulic pump is equivalent to the feed of said small motor, means for feeding at least one of said large motors without feeding said small motor when the feed of said hydraulic pump is equivalent to an even multiple of the feed of said small motor, and means for feeding said small motor and at least one of said large motors when the feed from said hydraulic pump is equivalent to an odd multiple of said feed of said small motor.

20. A hydraulic device in accordance with claim 19 wherein said hydraulic pump and said hydraulic motors have displacements adapted so that at the maximum speed of said motor being tested the feed of said hydraulic pump will be generally equal to the number of hydraulic motors multiplied by the feed of one of said large motors.

21. A hydraulic device in accordance with claim 20 wherein the displacements are selected as a function of the speed of rotation desired, which is a function of the frequency of the electric supply and of the number of pairs of poles of said asynchronous generator.

22. A hydraulic device in accordance with claim 19 wherein said means for feeding said hydraulic motors comprise two pressure relief valves provided with a setting device, said pressure relief valves being positioned in a hydraulic circuit upstream and downstream of a feed shunt for said small motor and of at least one solenoid-operated valve positioned within the feed shunts of said large motors.

23. A hydraulic device in accordance with claim 22 further comprising two pressure switches for controlling said solenoid-operated valve and wherein said upstream pressure relief valve regulates the back pressure of said hydraulic pump until the feed from said hydraulic pump equals the feed of said small motor.

24. A hydraulic device in accordance with claim 23 wherein one of said solenoid-operated valves controls the feeding of one of said large motors while hydraulic pressure is adjusted by said upstream valve.

25. A hydraulic device in accordance with claim 24 wherein said valves are adapted to control the feeding of said motors such that a feed from said hydraulic pump equal to an even multiple of the feed of said small motor causes a number of solenoid-operated valves equal to half of said even multiple to open and a feed from said volumetric pump equivalent to an odd multiple of the feed of said small motor causes said upstream valve to open and said small motor to feed.

26. A hydraulic device in accordance with claim 25 wherein when said odd multiple is greater than one, a number of solenoid-operated valves equal to one-half of the odd multiple less one are adapted to open.

27. A hydraulic device in accordance with claim 26 wherein one of said pressure switches is positioned downstream from said pressure relief valve and a second pressure switch is positioned within a setting circuit for the pressure relief valve and wherein said pressure switches control the opening and closing of said solenoid-operated valves as a function of the feed of said hydraulic pump to thereby permit the feeding of or the withdrawal from operation of said large motors.

28. A hydraulic device in accordance with claim 27 further comprising restrictions which are adapted to activate said pressure switches to create a sufficient load loss which is dependent upon the feed present.

29. A hydraulic device in accordance with claim 7 wherein at least one of said hydraulic pump and said hydraulic motors has a variable displacement.

* * * * *

UNITED STATES PATENT AND TRADEMARK OFFICE
CERTIFICATE OF CORRECTION

PATENT NO. : 4,368,391
DATED : January 11, 1983
INVENTOR(S) : Olivier Hellouin de Menibus It is certified that error appears in the above-identified patent and that said Letters Patent is hereby corrected as shown below:

In column 2, line 35, change "motors" to ---motor---.

In column 3, line 43, change "means" to ---minus---.

In column 6, line 33, after "furnished" at the end of the line, insert ---by the motor being tested and the theoretical Cpr power curve received by the generator---.

In column 6, line 34, change "by" to ---as---.

In column 8, line 22, change "(2n-1)/2n" to ---2n-1/2n---.

In column 6, line 33, after "generator" insert a -- , --.

line 34, change "the" (first occurrence) to --a--.

Signed and Sealed this

Twenty-eighth Day of June 1983

[SEAL]

Attest:

Attesting Officer

GERALD J. MOSSINGHOFF
Commissioner of Patents and Trademarks